(12) United States Patent
van Erven

(10) Patent No.: US 8,432,892 B2
(45) Date of Patent: *Apr. 30, 2013

(54) METHOD AND SYSTEM FOR WLAN SYNCHRONIZATION

(75) Inventor: Niels van Erven, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,937

(22) Filed: Aug. 23, 2011

(65) Prior Publication Data

US 2012/0051247 A1    Mar. 1, 2012

Related U.S. Application Data

(60) Division of application No. 11/943,297, filed on Nov. 20, 2007, now Pat. No. 8,023,495, and a continuation of application No. 11/102,436, filed on Apr. 8, 2005, now abandoned.

(51) Int. Cl.
*H04J 3/06* (2006.01)

(52) U.S. Cl.
USPC .................... 370/350; 370/345; 370/445

(58) Field of Classification Search .......... 370/229–240, 370/445–448, 210, 350, 345
See application file for complete search history.

(56) References Cited

U.S. PATENT DOCUMENTS

| | | | |
|---|---|---|---|
| 5,923,702 A | 7/1999 | Brenner et al. | |
| 6,693,915 B1 | 2/2004 | Lappetelainen et al. | |
| 6,816,510 B1 | 11/2004 | Banerjee | |
| 6,917,804 B2 | 7/2005 | Takayama et al. | |
| 7,126,937 B2 | 10/2006 | Crosbie et al. | |
| 8,023,495 B1 * | 9/2011 | van Erven | 370/350 |
| 2003/0145092 A1 | 7/2003 | Funato et al. | |
| 2005/0058121 A1 | 3/2005 | Santhoff et al. | |
| 2005/0058153 A1 | 3/2005 | Santhoff et al. | |
| 2005/0174953 A1 | 8/2005 | Ho | |
| 2005/0243954 A1 | 11/2005 | Li | |
| 2006/0098606 A1 | 5/2006 | Pandey et al. | |
| 2006/0133394 A1 | 6/2006 | Ware et al. | |

* cited by examiner

*Primary Examiner* — Christian Hannon

(57) ABSTRACT

A first access point for a multi-channel radio system includes a wireless transceiver to send and receive data; and a clock, with the first access point to: scan the multi-channel radio system to receive beacon signals transmitted from other access points operating in the multi-channel radio system; determine a Received Signal Strength Indication (RSSI) level for each beacon signal received from another access point operating in the multi-channel radio system; identify a second access point from which a beacon signal was received having a lowest RSSI level of all beacon signals received from other access points in the multi-channel radio system; and synchronize the clock with the second access point such that a beacon signal transmitted by the first access point is transmitted at the same time as a beacon signal from the second access point.

19 Claims, 5 Drawing Sheets

METHOD AND SYSTEM FOR WLAN SYNCHRONIZATION

RELATED APPLICATIONS

The present application is a divisional application and claims the priority under 35 U.S.C. §120 of U.S. application Ser. No. 11/943,297, filed Nov. 20, 2007, now U.S. Pat. No. 8,023,495 which is allowed, and is a continuation and claims the priority under 35 U.S.C. §120 of U.S. application Ser. No. 11/102,436, filed Apr. 8, 2005, which is abandoned. These previous related applications are hereby incorporated by reference in their respective entireties.

BACKGROUND

1. Field of the Invention

The present invention is directed to telecommunications. More particularly, the present invention is directed to methods and systems for synchronizing Access Points within a Wireless Local Area Network. However, aspects of the invention may be equally applicable in other scenarios as well.

2. Description of Related Art

Over the recent years, the market for wireless communications has enjoyed tremendous growth. Wireless technology now reaches or is capable of reaching virtually every location on the face of the earth. One reason for this tremendous growth has been the IEEE wireless Local Area Network ("LAN") standard 802.11.

An 802.11 LAN is based on a cellular architecture where the system is subdivided into cells. Each cell or Basic Server Set ("BSS") is controlled by a Base Station. This Base Station is often referred to as an Access Point ("AP"). Even though a wireless LAN may be formed by a single cell, with a single Access Point, and in certain arrangements it can also work without an Access Point. Generally, however, most LAN installations will comprise several cells. The Access Points connected through some kind of backbone called Distribution System ("DS"), typically Ethernet, and in some cases wireless itself.

The whole interconnected Wireless LAN including the different cells, their respective Access Points and the Distribution System, is seen to the upper layers of the OSI model, as a single 802 network, and is called in the Standard an Extended Service Set ("ESS").

The standard also defines the concept of a Portal where a Portal is a device that interconnects between an 802.11 and another 802 LAN. This concept is an abstract description of the functionality of a "translation bridge." As any 802.x protocol, the 802.11x protocol covers that MAC and Physical Layer, the Standard currently defines a single MAC which interacts with three PHYs (all of them running at 1 and 2 Mbit/s up to 54 Mbit/s). Frequency hopping spread spectrum in the 2.4 Ghz Band, Direct Frequency Spread Spectrum in the 2.4 GHz Band, and Infrared. Beyond the standard functionality usually performed by MAC Layers, the 802.11 MAC performs other functions that are typically related to upper layer protocols, such as Fragmentation, Packet Retransmissions, and Acknowledges. The MAC Layer defines two access methods, the Distributed Coordination Function and the Point Coordination Function.

The basic access mechanism, called Distributed Coordination Function, is a Carrier Sense Multiple Access with Collision Avoidance mechanism ("CSMA/CA"). CSMA protocols are known, where the most popular is the Ethernet, which is a CSMA/CD protocol (CD standing for Collision Detection).

With a CSMA protocol, a station desiring to transmit senses the medium. If the medium 20 is busy (i.e., some other station is transmitting), then the station will defer its transmission to a later time. If the medium is sensed free or available for transmission, then the station is allowed to transmit. These kinds of protocols are effective when the medium is not heavily loaded, since it allows stations to transmit with minimum delay. However, there is a chance of stations transmitting at the same time (collision), caused by the fact that the stations sensed the medium free and decided to transmit at once.

These collision situations should be identified, so that the MAC layer can retransmit the packet by itself and not by upper layer, which would cause significant delay. In the Ethernet case, this collision is recognized by the transmitting stations which go to a retransmission phase base on an exponential random backoff algorithm. While these Collision Detection mechanisms are a good idea on a wired LAN, such Collision Detection mechanisms are typically difficult to implement in a Wireless LAN environment. For example, implementing a Wireless LAN based Collision Detection Mechanism would require the implementation of a Full Duplex radio, capable of transmitting and receiving at once. Such a full duplex approach would also tend to increase the complexity and price of the system significantly.

In addition, on a wireless environment one cannot assume that aJI stations hear each other. This is generally a basic assumption of the Collision Detection scheme. The fact that a station willing to transmit and senses the medium free, does not necessarily mean that the medium is free around the receiver area. In order to overcome these two concerns, the 802.11 uses a Collision Avoidance mechanism together with a Positive Acknowledge scheme. In this Positive Acknowledge scheme, a station willing to transmit senses the medium is busy then it defers transmission. If the medium is free for a specified time (called DIFS, Distributed Inter Frame Space), then the station is allowed to transmit.

A receiving station will check the CRC of the received packet and send an acknowledgment packet ("ACK"). Receipt of the ACK will indicate to the transmitter that no collision occurred. If the sender does not receive the acknowledgment then it will retransmit the fragment until it gets acknowledged or thrown away after a given number of retransmissions.

In order to reduce the probability of two stations colliding because they cannot hear each other, 802.11 defines a Virtual Carrier Sense mechanism. A station willing to transmit a packet will first transmit a short control packet called RTS (Request to Send). The RTS includes the source, destination, and the duration of the following transaction (i.e., the packet and the respective ACK). The destination station responds (if the medium is free) with a response control Packet called CTS ("Clear to Send"). The CTS will include the same duration information.

Stations receiving either the RTS and/or the CTS, will set their Virtual Carrier Sense indicator (called NAV, for Network Allocation Vector), for the given duration, and will use this information together with the Physical Carrier Sense when sensing the medium. This mechanism reduces the probability of a collision on the receiver area by a station that is "hidden" from the transmitter, to the short duration of the RTS transmission, because the stations will hear the CTS and "reserve" the medium as busy until the end of the transaction. The duration information on the RTS also protects the transmitter area from collisions during the ACK (by stations that are out of range from the acknowledging stations).

Because RTS and CTS are short frames, it also reduces the overhead of collisions, since these are recognized faster than it would be recognized if the whole packet was to be transmitted, (this is true if the packet is significantly bigger than the RTS, so the standard allows for short packets to be transmitted without the RTS/CTS transaction, and this is controlled per station by a parameter called RTS Threshold.

Typical LAN protocols use packets of several hundred of bytes (e.g., Ethernet longest packet could be up to 1518 bytes long), on a Wireless LAN environment there are some reasons why it would be preferable to use smaller packets. For example, because of the higher Bit Error Rate of a radio link, the probability of a packet to get corrupted increases with the packet size. In addition, in the case of packet corruption (either because of collision or noise), the smaller the packet the less overhead it causes to retransmit it. In addition, on Frequency Hopping system, the medium is interrupted periodically for hopping (in our case every 20 milliseconds), so the smaller the packet, the smaller the chance that the transmission will be proposed to after the dwell time.

The mechanism is a simple Send-and-Wait algorithm, where the transmitting station is not allowed to transmit a new fragment until one of the following happens: receives an ACK for the said fragment or decides that the fragment was retransmitted too many times 15 and drops the whole frame.

Exponential Backoff is a method that attempts to resolve contention between different stations willing to access a medium. The method requires each station to choose a Random Number n between 0 and a given number. Then, wait for this number of Slots before accessing the medium, and then checking whether a different station has accessed the medium before. The Slot Time is defined in such a way that a station will be capable of determining if another station has accessed the medium at the beginning of the previous slot. This reduces the collision probability by half.

Exponential Backoff means that each time the station chooses a slot and happens to collide, it will increase the maximum number of the random selection exponentially. 802.11 defines Exponential Backoff Algorithm that will be executed in the following case. Where, if when the station senses the medium before the first transmission of a 5 packet, and the medium is busy.

When a station wants to access an existing BSS (either after power-up, sleep mode, or just entering the BSS area), the station needs to receive synchronization information from an Access Point (or from the other stations when in an ad-hoc mode). The station can get this information by one of two means: passive scanning or active scanning. First, it may 10 get this information by passive scanning. In the passive scanning case, the station waits to receive a beacon frame from the AP. The beacon frame is a periodic frame sent by the AP with synchronization information.

Alternatively, active scanning may be used where a station tries to find an AP by transmitting Probe Request Frames, and waiting for Probe Response from the AP. Either of these methods may be chosen according to the power consumption/performance itself Once the station has found an AP, and the station has decided to join the AP's BSS, the station will go through the Authentication Process. This Process is an interchange of information between the AP and the station, where each side proves the knowledge of a given password.

When a station is authenticated, then the station will start the Association Process. This process is the exchange of information about the stations and BSS capabilities, and which allows the DSS (the set of APs to know about the current position of the station). Only after the association process is completed, a station is capable of transmitting and receiving data frames.

Stations need to keep synchronization since this is needed for keeping hopping synchronized, and other functions like Power Saving. On an infrastructure BSS this is performed by all the stations updating their clocks according to the AP's clock. This synchronization occurs as the AP transmits periodic frames called Beacon Frames. These Beacon Frames contain the value of the AP's clock on the moment of transmission.

Note that this is the moment when the transmission really occurs, and not when it is put in the queue for transmission, since the Beacon Frame is transmitted using the rules of CSMA, the transmission may be delayed significantly.

The receiving stations check the value of their clock at the receiving moment and correct it to keep synchronizing with the AP's clock. This prevents clock drifting which could cause loss of synchronization after a couple hours of operation.

In a typical wireless network, such as a Wireless Local Area Network ("WLAN") system, 15 each Access Point ("AP") will have it's own internal clock. Each independent clock will also define the Time Division Multiplexing ("TDMA") timing of the SSID area that this AP covers. Consequently, this means that all AP's, provided in a certain WLAN SSID area, will be not be synchronized. Consequently, these unsynchronized BSS cells may interfere with one another. These unsynchronized BSS cells will interfere with each other even if they are operating on the same channels or alternatively adjacent yet different channels.

In an effort to reduce such interference concerns, it is generally known that the overall system throughput may be improved when there is at least beacon synchronization and scheduling between all stations in the ESS environment. Existing mechanisms like fragmentation, data rate back-off, adaptive contention window threshold, as other mechanisms, will help improve the system throughput to a certain extent. However, there is, therefore, a general need for a method and system for synchronizing WLAN APs. There is also a general need for a method and system for synchronizing WLAN APs while also improving system capacity and QoS by utilizing AP synchronization and beacon scheduling.

SUMMARY

According to an exemplary embodiment, a method of synchronizing a first Access Point and a second Access Point is provided to increase an overall system capacity due to a reduction of inherent packet collisions in an un-synchronized WLAN deployment. Preferably, the method comprises the steps of deploying the first and the second Access Point within a wireless network and utilizing the first Access Point to detect a presence of the second Access Point. A first periodic Beacon Frame of the first Access Point is synchronized with a first periodic Beacon Frame of the second Access Point.

According to another exemplary embodiment, a system for synchronizing a wireless cellular architecture is provided. This system includes a first Access Point and a second Access Point deployed in the wireless cellular architecture. A presence of the second Access Point is detected by the first Access Point. A first periodic Beacon Frame of the first Access Point is synchronized with a first periodic Beacon Frame of the second Access Point.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION

Figure 1:
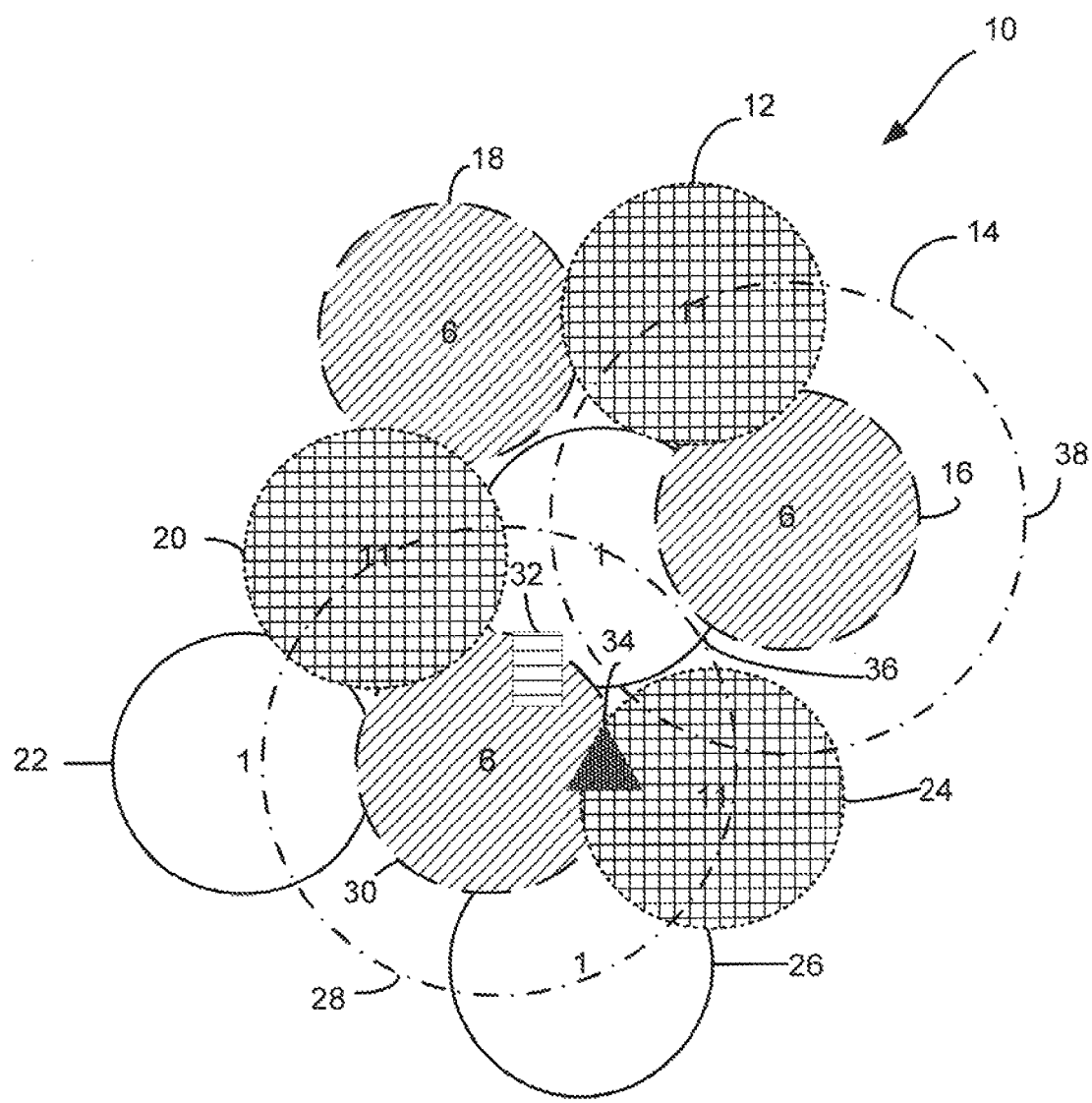
FIG. 1 illustrates one arrangement for an ESS comprising a plurality of AP's operating on various channels.

There are several interference scenarios which can arise in a BSS/ESS and related interference characteristics that will need to be discussed. Each interference scenario depends how the pathloss and selectivity filter works out.

Pathloss is calculated as follows:

Pathloss (PL)=(32.4+20 log F (MHz)+20 log D (km)), where F is the Frequency in MHz and D is the Distance in Kilometers.

In one arrangement, where F=2.4 GHz, this results in a path-loss: PL=32.4+67.6+20 log D $R_x$=radius of the coverage circle @xMbps, x∈{1,2,5.5,11, 6,9,12,18,24,36,48,54}

$SIR_{aaci,Rx}$=SIR required to get $10^{-2}$ PER for xMbps at a $R^x$ radius with adjacent/alternate channel int reference $SIR_{cci,Rx}$=SIR required to get $10^{-2}$ PER for xMbps at a $R^x$ radius with co-channel int reference $SIR_{cci,Rx}$=$SIR_{aaci,Rx}$4.6 dB (with ideal sphere packing)

In the above equations, $SIR_{aaci}$ represents a signal to interference ratio that arises between two cells that are operating on different or alternate channels. And $SIR_{aaci}$ represents a signal to noise ratio that may arise between two cells that are operating on the same or similar channels. Regarding the $SIR_{aaci}$ case (i.e., adjacent/alternate channel interference), a selectivity filter attenuates the signal in general by about 35 dB. Each multi channel radio system, such as 802.11, has minimal requirements on how much the adjacent and alternate channels has to be suppressed by the selectivity filter. It's up to the radio vendor how much they want to improve on this. Such is generally not the case for the $SIR_{cci}$ case (co-channel interference). So at the boundary of the coverage circles for e.g. $R_{5.5}$ (to allow some coverage overlap for R1 and R2, required for roaming), the co channel interference cell results in about 30 dB more interference than the adjacent channel cells. This is an important phenomenon when considering Access Point deployment within a BSS or ESS.

The change of Access Point's interfering with one other: In a normal Access Point deployment scenario, the various AP's will be located generally e.g. about 20 to 25 meters apart from each other. With such a general placement location, this would mean that the signals received from a first AP by a second AP (operating on a different channel) will be about −80 dBm. This value may be calculated using the pathloss PL formula +35 dB for selectivity filter provided above. The sensitivity of 1 Mbps can be around −93 dBm. This indicates that the change that every received package will be corrupted due to an AP in the vicinity operating on a different channel can not be ignored. The data rate Backoff Mechanism discussed above generally may help in reducing this IS corruption issue to a certain degree.

There are a variety of scenarios that may arise for which CSMA/CA initiates the Backoff scenario. These scenarios will result in reduced capacity or where interference can occur regardless of CCA. Consequently, because of such interference, there is a general likelihood that data packages will be destroyed and that further packet retransmission will be required.

FIG. 1 illustrates one arrangement for an ESS 10 comprising a plurality of APs operating on various channels. ESS 10 comprises a plurality of APs some of which are operating on the same channel and some of which are not operating on the same channel. More specifically, ESS 10 comprises APs operating on channels 1, 6, and 11. The first dotted line of each AP is indicative of 11 Mbps coverage. Note that two coverage areas of 1 Mbps coverage areas are also shown. The first 1 Mbps coverage 38 is shown for AP 16 and the second 1 Mbps coverage area 28 is illustrated for AP 30.

ESS 10 comprises a first set of APs operating on channel 1 (AP 22, 26, and 36), a second set of APs operating on channel 6 (AP 16, 18, and 30), and a third set of APs operating on channel 11 (AP 12, 20, 24). Note the spatial orientation of the APs operating of the different channels. The locations of the various APs in ESS 10 present a number of interference possibilities.

For example, one such interference scenario arises where AP's are operating on the same channel and these APs will interfere with one another. For example, referring to FIG. 1, AP 16 and AP 30 are both operating on channel 6 and will consequently interfere with one another as illustrated by the 11 Mbps coverage area for AP 16 and 30. The 1 Mbps power level 38 of AP 16 is illustrated as overlapping with the 11 Mbps power level of 15 client 32 residing in AP 30 coverage area.

Another interference scenario will arise where AP's are operating on different channels and will interfere with one another. For example, the cluster of three AP's 36, 30, 24 operating on channels 1, 6, and 11, respectively, will interfere with one another. Therefore, client 34 residing between these three APs will experience interference from two out of these three APs (one AP is the AP it communicates with).

Another interference scenario will arise where the APs operating on different channels interfere with one another as adjacent and alternate channel interference. Such interference may be seen by the various small dashed circles defining the operating area of each AP. Yet another interference situation arises where a client detects an AP on the same channel but is not necessarily associated with that particular detected AP. For example, referring back to FIG. 1, such an interference situation could arise for client 32 by the 1 Mbps operating coverage of AP 16, resulting in co-channel interference. A similar interference situation could arise where a client detects AP's on different channels. For example, a client could detect AP 16 operating on channel 6 while also detecting AP 36 operating on channel 1.

Another concern that may arise occurs where a client interferes with a client(s) on same channels of different BSS. And yet another concern is client interference with clients on different channels of a different BSS.

Typically, in an ordinary BSS or ESS layout, AP's operating on a similar channel will be located further away as that is the only "selectivity" mechanism available to reduce interference. Typically, adjacent and alternate channels can be located closer to each other as the selectivity filter will enable that. In general a selectivity filter can suppress approximately 35 dB for an alternate channel, and can suppress somewhat less for an adjacent channel. Consequently, an AP on an alternate channel may be located on the order of approximately 5 to 6 times closer to the AP under consideration, then cochannel AP. Therefore, in a typical BSS/ESS cellular deployment, such as the cellular deployment depicted in FIG. 1, co-channel AP's have a higher chance to interfere with each other.

As previously discussed, WLAN uses DCF as the control method to allow clients to have access on the BSS. Within these BSS, clients are time synchronized to a specific AP with whom they are associated with. All other clients and AP's in a ESS deployment are not synchronized with each other. For Example, AP's illustrated in FIG. 1 are not synchronized with one another.

Stations within a BSS need to keep synchronization, this is needed for keeping hopping synchronized, and other functions like Power Saving. On an infrastructure BSS this is performed by all the stations updating their clocks according to an AP clock. This synchronization occurs as the AP transmits periodic frames called Beacon Frames. These Beacon Frames contain the value of the AP's clock on the moment of transmission. Not that this is the moment when the transmission really occurs, and not when it is put in the queue for transmission, since the Beacon Frame is transmitted using the rules of CSMA, the transmission may be delay significantly.

The receiving stations check the value of their clock at the receiving moment and correct it to keep synchronizing with the AP's clock. This prevents clock drifting which could cause loss of synchronization after a couple hours of operation. Within a ESS, the stations from one BSS with a other BSS will however not be synchronized.

Figure 2:
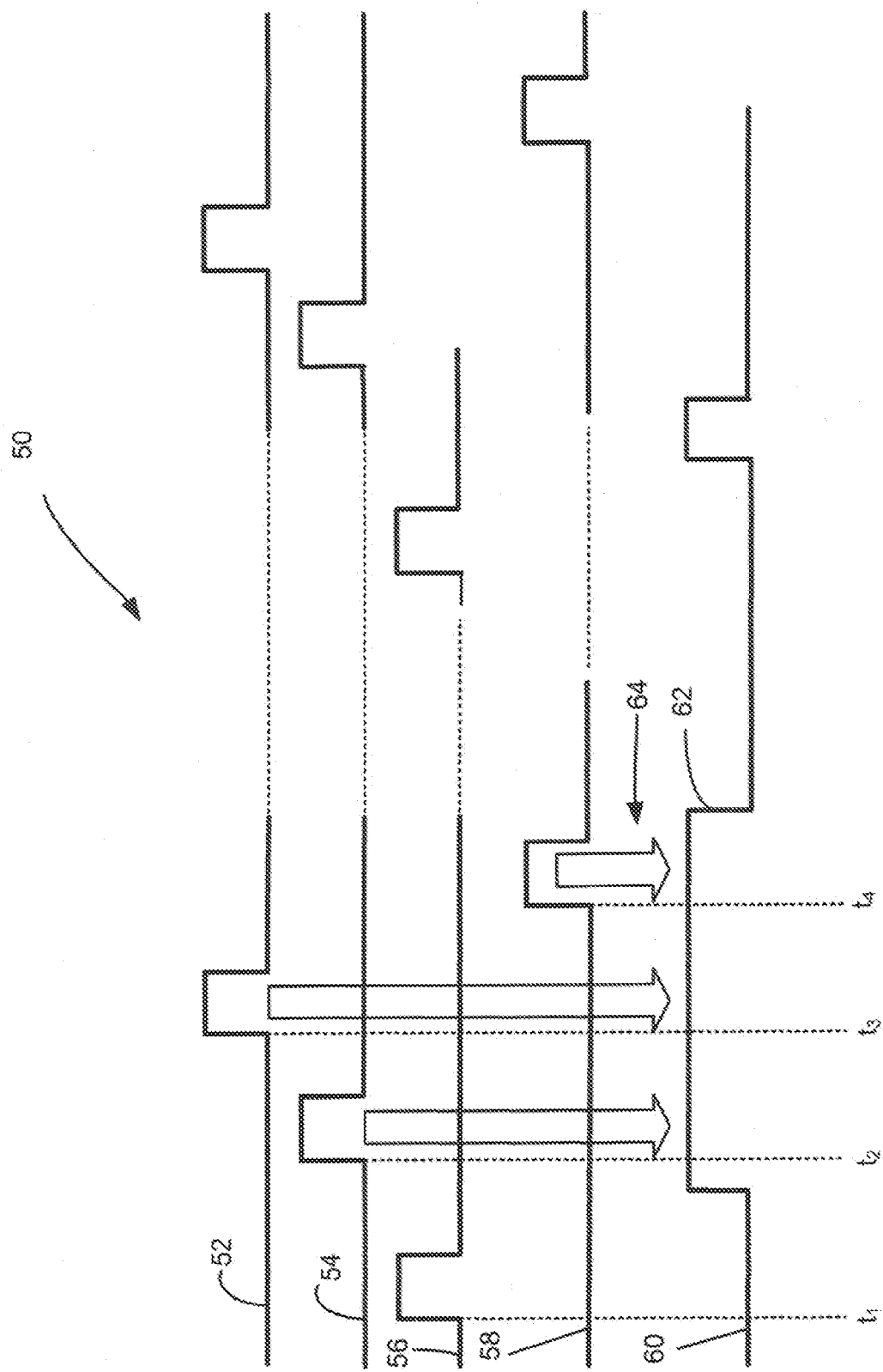
FIG. 2 provides one illustration of various transmitted Beacon Frames from a plurality of unsynchronized Access Points.

FIG. 2 provides one illustration 50 of how various transmitted Beacon Frames from a plurality of unsynchronized Access Points may interrupt or corrupt a data packet in an ESS, such as the ESS illustrated in FIG. 1. As shown in FIG. 2, four beacon timing graphs 52, 54, 56, and 58 are illustrated. Beacon timing graphs 52, 54, 56, and 58 are generated by four different APs operating in a ESS. For example, in one arrangement, beacon timing graph 52 could be generated by an AP operating on channel 1, beacon timing graph 54 could be generated by an AP operating on channel 6, beacon timing graph 56 could be generated by an AP operating on channel 11, and beacon timing graph 58 could be generated by an AP operating on yet another different channel.

Since each of the four APs are operating on a different channels, each AP will generate a different beacon timing graph. The top most timing graph 52 a first beacon timing graph from a first AP, a second beacon timing graph from a second AP, and a third beacon timing graph from a third AP. As shown in timing graph 52, the beacons from three different AP are not synchronized and arise at different times. For example, in this arrangement, beacon 52 from a first AP occurs at time t1 while the second beacon 54 from a second AP occurs at time t2, a third beacon 56 from a third beacon 3 occurs at time t3, and yet the fourth beacon occurs at time t4.

The fifth timing graph 60 in FIG. 2 illustrates a timing of a data package 62 received from a fifth AP. Comparing the five timing graphs 52, 54, 56, 58, 60, it can be seen that the beacons generated by the first AP, the second AP, and the fourth AP's interfere with the data 62 received by the fifth AP in this unsynchronized ESS.

Figure 3:
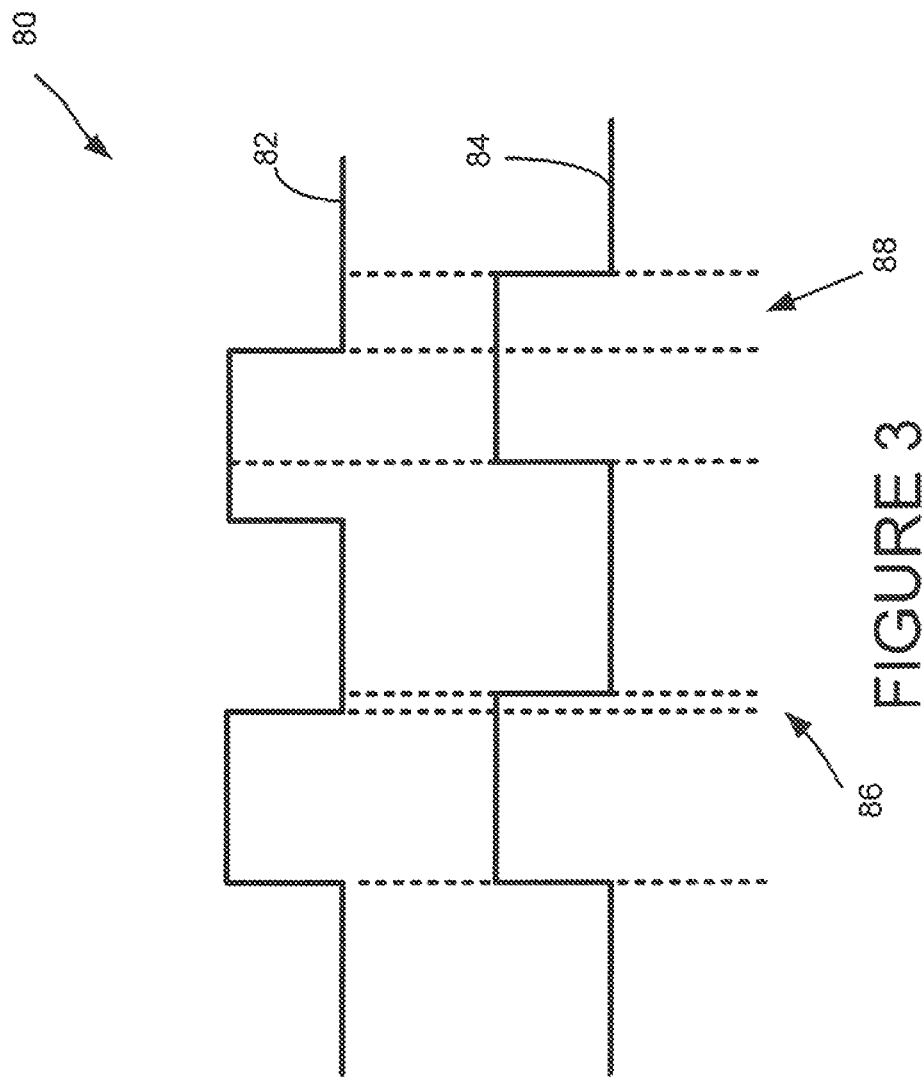
FIG. 3 illustrates beacon timing graphs from two AP having inconsistent clock frequencies.

The beacon timing interference concerns as illustrated in FIG. 2, will not occur at fixed time instances. This relates to the accuracy of the AP clock frequencies. For example, FIG. 3 illustrates clock timing graphs from two AP's having inconsistent clock frequencies. More specifically, FIG. 3 illustrates the effect if two clocks having different frequencies. Such inconsistent clock frequencies may be due to the 25 or 20 ppm clock accuracy requirement.

As shown in FIG. 3, the frame 82 of a first AP (such as AP 16 in FIG. 1) may be slightly shorter than frame 84 for a second AP (such as AP 36 in FIG. 1), having the exact same amount of bits/symbols in the frame. Such a frame difference is due to the clock differences between the two AP's. Consequently, there is a first difference delta 86 that quantifies the difference in frames between the first and second frames 82 and 84, respectively. Therefore, over a certain period of time, the frames from the first AP may slide over the frames from the second AP2. For example, in one arrangement comprising a system having a 25 ppm clock accuracy, this may result in a time slip of about 5 minutes that two frames will side over each other from beginning to end. For example, after a certain period of time, there will be a second difference delta 88 between the two frames 82 and 84. The effect mentioned above is very much present for all the beacons sent out by the AP's.

As there are a number of potential interference scenarios present in a WLAN system where APs are not synchronized, and as a WLAN system has a highly random behavior, only one case will be highlighted to give some qualitative insight. Eventually extensive discrete event simulation can be used to determine the detailed improvements for different scenarios and applications.

For example, when client 32, in FIG. 1, is associated with AP 30, the beacons of the other APs, such as AP 36 and AP 20, can interfere with the data frames transmitted by 15 AP 30 and intended for client 32. This provides that e.g. the beacon power of AP 36, received at client 32, may be above a Gaussian noise floor when client 32 receives that power. This would results in client 32 having a lower data rate or even loosing data package send out by AP 30.

There are several ways to eliminate this un-synchronized packet interference phenomena between different BSS cells. A first ideal solution is a complete synchronous TDMA approach over an ESS. This should be done for each AP and each Access Controller ("AC"). An access controller, also referred to as a wireless switch, can be considered as a sub-ESS. Within an AC, the timing control of packet is much better than for fit (stand alone AP) AP's as each fit AP (fit AP: AP's controlled by the AC), inherently has a tight control with the AC. But between different AC's the same problem exist as between fat AP's. So the synchronization and scheduling mechanism should be applicable for both fat AP's as AC's over different BSS and even ESS deployments.

As each fit AP and AC can be considered independent stand alone units, they must synchronize amongst one another. Synchronization may be accomplished among the plurality of APs and ACs comprising the ESS by having these entities communicate amongst themselves. There are a number of methods for such communication. For example, in one arrangement, the APs and ACs synchronize with each other by methods used in Bluetooth, DECT, GSM, etc.

These methods use the following approach: during acquisition/bootstrapping each AP and/or AC scans the operating environment for other APs or ACs. When there is no other AP or AC present, the AP or AC it simply begin a normal operation. Alternatively, if the AP or AC determines during the acquisition or bootstrapping process that there is another AP/AC present, the AP it will synchronize to it such that it's own beacons will not collide with the beacons of the other AP's and AC's.

Over the air synchronization will inherently protect synchronization for it's associated client with respect to neighborhood BSS's/EES's cell's. An AC, which does not use over the air synchronization, but only uses hardware synchronization, can't guarantee this as it will not adjust itself to other AC's or fit AP's.

One method of synchronizing AP's that preserves overall system bandwidth comprises the steps of combining beacons of various APs and ACs in a sequential manner. Such a sequential arrangement may depend on certain factors. For example, such a sequential arrangement may depend on the size and/or the number of AP's deployed within a specific BSS or ESS.

Figure 4:
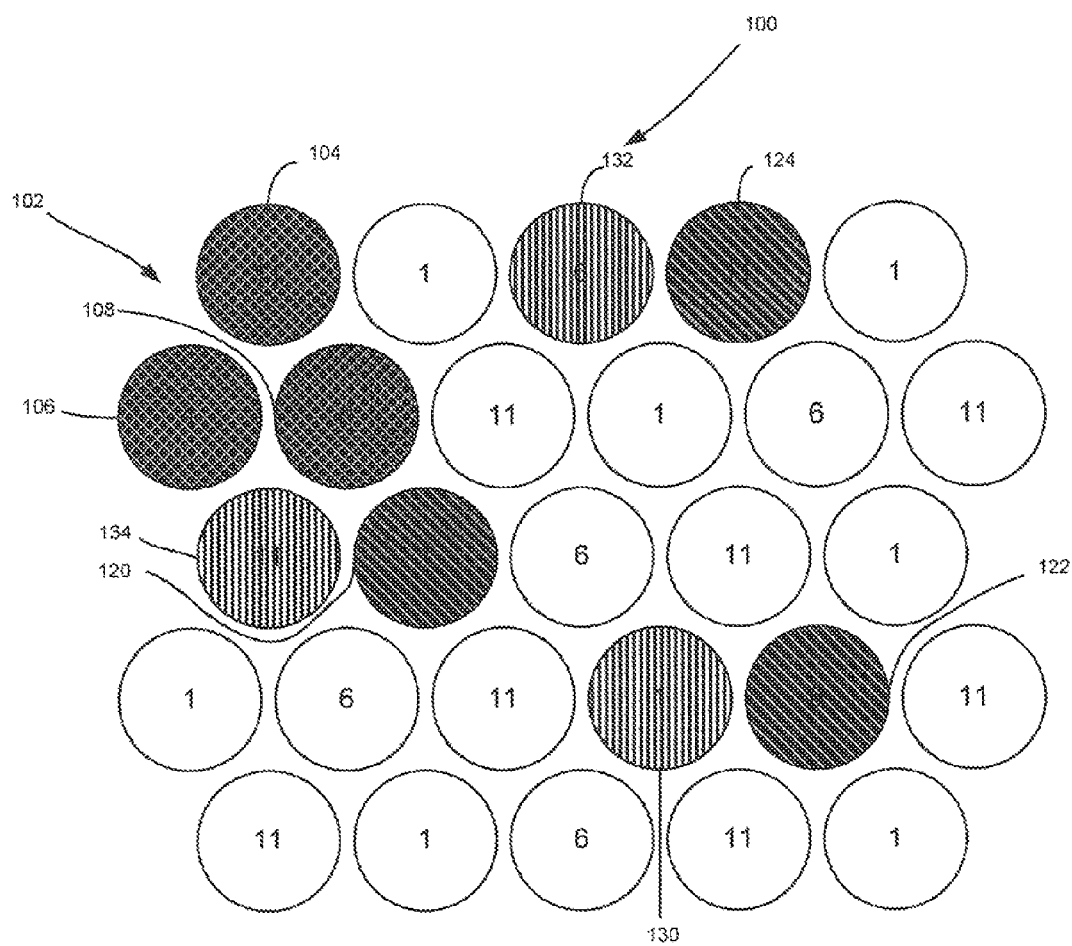
FIG. 4 illustrates a plurality APs' (and/or ACs) transmitting over different channels.

For example, FIG. 4 illustrates a ESS comprising a plurality APs' operating on three different channels. In the ESS arrangement illustrated in FIG. 4, these three channels include 1, 6, and 11. For example AP 104 is operating on channel 11, AP 106 is operating on channel 1, and AP 108 is operating on channel 6. Preferably, the plurality of APs illustrated in FIG. 4 are so configured in an attempt to reduce adjacent/alternate channel interference as well as co-channel interference. As those of ordinary skill in the art will recognize, however, alternative arrangements and/or deployments may be used as well.

In an arrangement comprising a large deployment of APs, there may be many channel 1, 6 and 11 clusters defined. In such an arrangement as illustrated in FIG. 4, AP 132, 134, 130 operating on channels 1, 6 and 11, respectively are configured with the same cross hatching and therefore may define a first beacon cluster 111 (cluster 111 is not referred to anything. It should refer to FIG. 5 cluster 152). Although these three APs 132, 134, and 130 are operating on different channels (i.e., channel 6 for AP 132, channel 11 for AP 134 and channel 1 for AP 130), these APs will be synchronized so that they will transmit their respective beacons at the same time.

Figure 5:
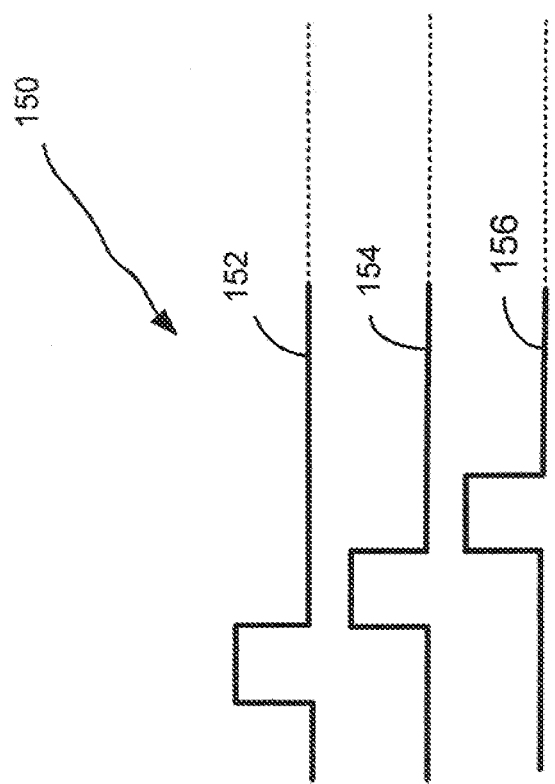
FIG. 5 illustrates an arrangement of sequential beacons.

Similarly, AP 120, 124, and 122 operating on channels 1, 6 and 11, respectively are configured with the same cross hatching and therefore may define a second beacon cluster 154 (FIG. 5). Although these three APs 120, 124, and 122 are operating on different channels (i.e., channel 1 for AP 120, channel 6 for AP 124 and channel 11 for AP 122), these APs will be synchronized so that they will transmit their respective beacons at the same time.

In an arrangement where only a small number of APs may be used, each AP may define a separate cluster. For example, in a system illustrated in FIG. 4, AP 104 may define a first cluster, AP 106 may define a second cluster, and AP 108 may define a third cluster. Then, in such an arrangement, a first beacon signal will be transmitted by AP 104, while the second beacon signal will be transmitted by the second AP 108 while a third beacon signal will be transmitted by AP 106.

FIG. 5 illustrates an arrangement 150 of a plurality of sequential beacons. As illustrated in FIG. 5, three beacon signals 152, 154, and 156 are provided. Each beacon signal 152, 154, and 156 is related to one of the AP clusters defined in FIG. 4. For example, for beacon cluster 102, a first beacon signal 152 may be representative of AP 104, while the second beacon signal 154 is representative of the second AP 108 while the third beacon signal may be representative of AP 106.

There are a number of assignment algorithms that may be used in an arrangement comprising a randomly deployed environment of APs, such as the AP deployment illustrated in FIG. 4. For example, in one arrangement, a first AP listens to an ambient environment and detects the other deployed AP's since these are transmitting beacons. The first AP performs this scanning on all channels (1, 6, and 11 for the 2.4 GHz ISM band, or all the 5 GHz channels for 802.11 a). When the beacon of a second AP is received at a RSSI level which is the lowest detected RSSI, the first AP will synchronize to that second AP. In this manner, when the first AP commences transmission of it's beacons, the first and the second AP will transmit at the same time. However, the second AP will alter its channel before it starts transmitting it's beacons.

Other solutions schedule the beacons transmission one after the other for each AP in succession. One disadvantage of such an approach is that this approach requires more bandwidth. One advantage of the present solution versus such other approaches is that it results in beacon times being on average of about 300 us. Therefore, to utilize such beacon transmission schemes for a 48 port AC, it will take approximately 14 ms to synchronize these beacons in the proper sequence. Consequently, this will consume 14% of the available capacity/bandwidth. If the beacons are scheduled based upon channel clustering as suggested above, it will only consume approximately 1% of the available capacity for 802.11b band g.

To optimize this scheduling a second mechanism is proposed and that involves accurate synchronization. Such a mechanism may be used to optimize the timing of CCA approach in CSMA/CA. For example, regarding compensating round trip delay for VoIP clients. When a packet is sent from an AP to a client, the air propagation delays reception. After the VoIP client transmits back it's voice data, the same propagation delay will exist. This delay will be different for each client in a BSS (some are close to the AP, others are further away). To optimize expectation of reception and to reduce jitter (and indirectly system capacity), accurate timing is required.

To reduce the number of times that fat AP's and AC's need to update their synchronization with it's environment. The lower the ppm, the less scan efforts needs to be performed. This will result in a reduced demand for bandwidth.

In an alternative arrangement where the WLAN system is operating in a PCF or HCF mode, for certain critical real time applications like VoIP, the AP sends out a voice packet to a VoIP client. For ideal Quality of Service and system performance, it is required that the AP knows when to receive a packet back. As the time of the voice packet and the time of the handset processing time are known, the only variables are air propagation and Xtal offset between the stations. As the handset listens to the beacons, it can then self synchronize it's own internal clock (VCXO). Consequently, this results in getting the clock of the AP and the clock of the handset synchronized to less than approximately 0.1 ppm. This accurate synchronization approach is used in wireless TDMA systems throughout the industry and is considered common knowledge.

Exemplary embodiments of the present invention have been described. Those skilled in the art will understand, however, that changes and modifications may be made to these embodiments without departing from the true scope and spirit of the present invention, which is defined by the claims.

What is claimed is:

1. A first access point for a multi-channel radio system, said first access comprising:
    a wireless transceiver to send and receive data; and
    a clock,
    said first access point to:
        scan the multi-channel radio system to receive beacon signals transmitted from other access points operating in the multi-channel radio system;
        determine a Received Signal Strength Indication (RSSI) level for each beacon signal received from another access point operating in the multi-channel radio system;

identify a second access point from which a beacon signal was received having a lowest RSSI level of all beacon signals received from other access points in the multi-channel radio system; and synchronize said clock with the second access point such that a beacon signal transmitted by the first access point is transmitted at the same time as a beacon signal from the second access point.

2. The access point of claim 1, wherein the first access point scans all channels of the multi-channel radio system to receive beacon signals from other access points in the system.

3. The access point of claim 1, wherein said first access point, after synchronizing with the second access point, operates on a different channel than the second access point.

4. The access point of claim 1, wherein said first access point, before synchronizing with the second access point, operates on a different channel than the second access point.

5. The access point of claim 1, wherein the first access point scans 5 GHz channels defined by the 802.11a standard.

6. The access point of claim 1, wherein the first access point scans channels of 2.4 GHz Industrial, Scientific and Medical (ISM) radio bands.

7. The access point of claim 1, wherein the first access point is a carrier sense multiple access with collision avoidance (CSMA/CA) access point.

8. The access point of claim 1, wherein the first access point transmits beacon signals comprising a value of the clock of the first access point at a time when the first access point transmits that beacon signal.

9. The access point of claim 1, wherein synchronizing with the second access point comprises adjusting the clock of the first access point using clock data in the beacon signal received from the second access point.

10. A first access point for a multi-channel radio system, said first access comprising:
    a wireless transceiver to send and receive data; and
    a clock,
    said first access point to:
        transmit a beacon signal, said beacon signal comprising a value of the clock of the first access point at a time when the first access point transmits that beacon signal,
        such that a second access point operating in the multi-channel radio system synchronizes a clock of that second access point by extracting the time data from the beacon signal of the first access point and adjusting the clock of the second access point in accordance with that time data from the beacon signal of the first access point.

11. The access point of claim 10, wherein said first access point transmits on a first channel prior to synchronizing with said second access point and then changes to transmit on a second channel after synchronizing with said second access point.

12. The access point of claim 10, the first access point to scan the multi-channel radio system to receive beacon signals transmitted from other access points operating in the multi-channel radio system;

determine a Received Signal Strength Indication (RSSI) level for each beacon signal received from another access point operating in the multi-channel radio system;

identify an access point from which a beacon signal was received having a lowest RSSI level of all beacon signals received from other access points in the multi-channel radio system; and synchronize with that access point having the lowest RSSI level such that a beacon signal transmitted by the first access point is transmitted at the same time as a beacon signal from the access point having the lowest RSSI level.

13. The access point of claim 12, wherein the first access point scans all channels of the multi-channel radio system to receive beacon signals from other access points in the system.

14. The access point of claim 10, wherein said first access point, before synchronizing with the second access point, operates on a different channel than the second access point.

15. The access point of claim 10, wherein the first access point transmits on a 5 GHz channel defined by the 802.11a standard.

16. The access point of claim 10, wherein the first access point transmits on a channel of 2.4 GHz Industrial, Scientific and Medical (ISM) radio band.

17. The access point of claim 10, wherein the first access point is a carrier sense multiple access with collision avoidance (CSMA/CA) access point.

18. Access points for a multi-channel radio system, each access point comprising a wireless transceiver to send and receive data; and a clock, comprising:
    a first access point to:
        scan the multi-channel radio system to receive beacon signals transmitted from other access points operating in the multi-channel radio system;
        determine a Received Signal Strength Indication (RSSI) level for each beacon signal received from another access point operating in the multi-channel radio system;
        identify a second access point from which a beacon signal was received having a lowest RSSI level of all beacon signals received from other access points in the multi-channel radio system; and
        synchronize with the second access point such that a beacon signal transmitted by the first access point is transmitted at the same time as a beacon signal from the second access point; and
    said second access point to:
        transmit said beacon signal having a lowest RSSI level at said first access point, that beacon signal comprising a value of the clock of the second access point at a time when the second access point transmits that beacon signal.

19. The access points of claim 18, wherein said second access point transmits on a first channel prior to synchronizing with said first access point and then changes to transmit on a second channel after synchronizing with said first access point.

* * * * *